May 8, 1923.

A. HELLEBRAND

VEHICLE SIGNAL

Filed Dec. 3, 1921

INVENTOR

Anthony Hellebrand

By W. W. Williamson Atty.

May 8, 1923.
A. HELLEBRAND
VEHICLE SIGNAL
Filed Dec. 3, 1921
1,454,114
2 Sheets-Sheet 2
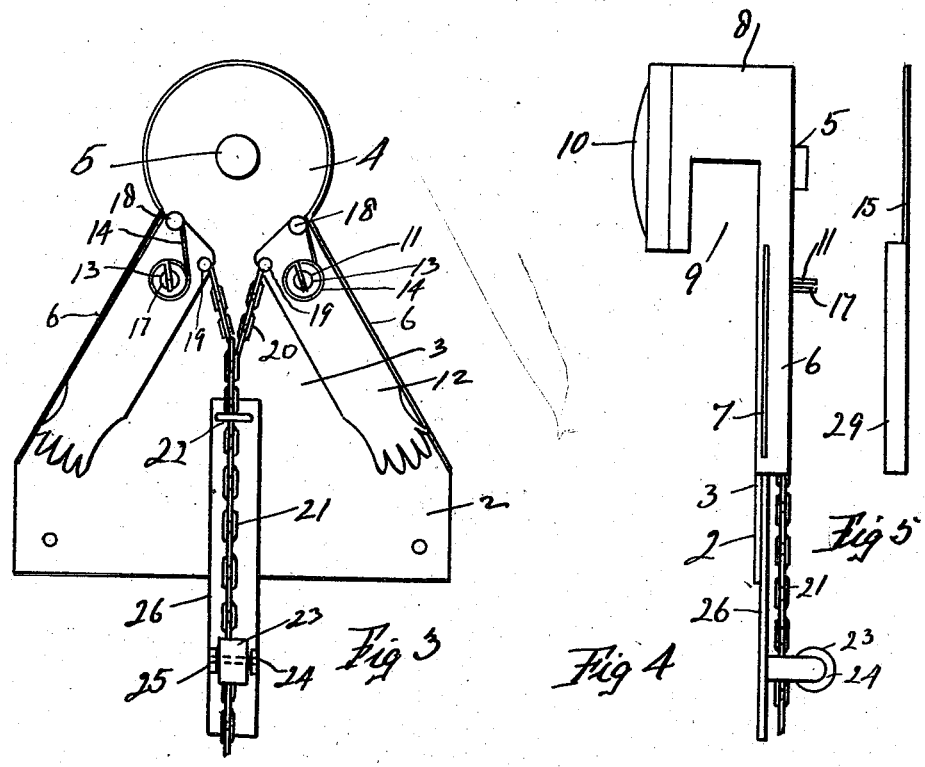
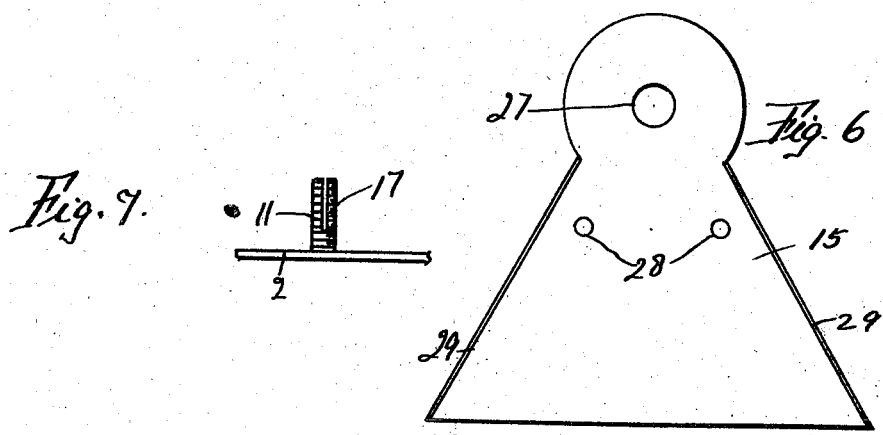
INVENTOR
Anthony Hellebrand
By W. W. Williamson
Atty.

Patented May 8, 1923.

1,454,114

UNITED STATES PATENT OFFICE.

ANTHONY HELLEBRAND, OF PHILADELPHIA, PENNSYLVANIA.

VEHICLE SIGNAL.

Application filed December 3, 1921. Serial No. 519,595.

*To all whom it may concern:*

Be it known that I, ANTHONY HELLEBRAND, a subject of Austria, residing at Philadelphia, in the county of Philadelphia and State of Pennsylvania, have invented new and useful Improvements in a Vehicle Signal, of which the following is a specification.

My invention relates to new and useful improvements in a vehicle signal, and has for its object to provide an exceedingly simple and effective device of this character which is adapted to be attached to the rear of the vehicle such as an automobile actuated by the operator of said vehicle to indicate his intentions to stop in order that following traffic may slow down or come to a standstill, thereby preventing accidents.

Another object of my invention is to provide means for actuating the signal by means of the brake lever or by means of another lever operating in the same manner but only connected with the signal device.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 3, is an enlarged inner face view of the signal with the cap removed.

Fig. 4, is a side elevation or edge view of that portion of the signal shown in Fig. 3.

Fig. 5, is a similar view of the cap or cover.

Fig. 6, is an inner face view thereof.

Fig. 7, is a fragmentary sectional view of the signal casing in the region of one of the cap retaining screws.

Figure 1:
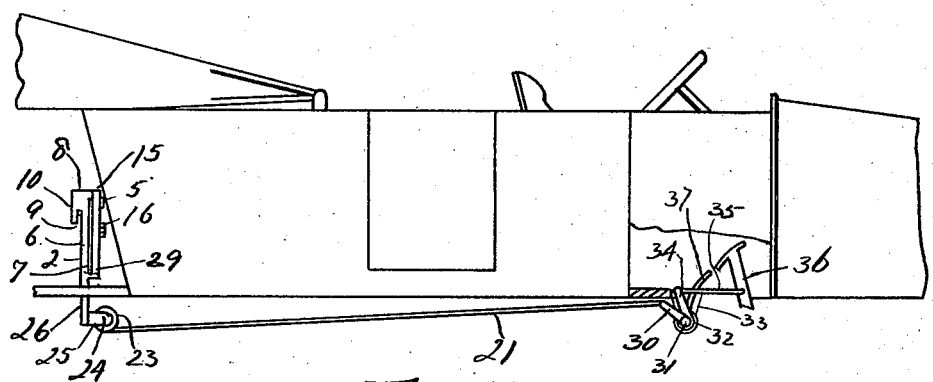
Fig. 1, is a fragmentary side elevation of a vehicle body, such as an automobile, to which the signal is attached a portion of the vehicle being broken away to clearly illustrate the arrangement of the different parts.
Figure 2:
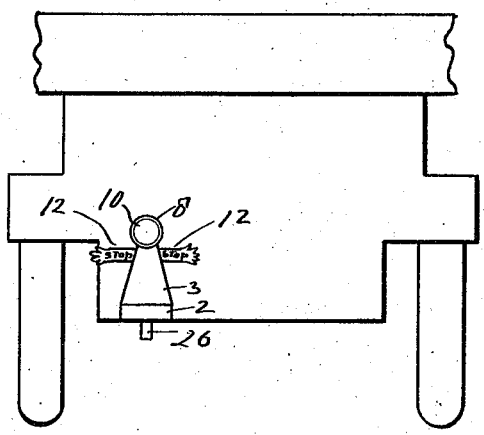
Fig. 2, is a rear view of the same showing the signal in operative position.

In carrying out my invention as here embodied, 2 represents the front plate of the signal casing consisting of a body portion 3 and a head 4, said head carrying the lamp socket 5 for the reception of an electric light bulb and the attachment of suitable conducting wires. The side edges of the body portion of the front plate preferably converge toward their upper ends and these converging edges are provided with flanges 6 in which are formed the slots 7 situated adjacent the said front plate.

The lamp hood 8 is formed as an extension of the flanges 6 and the lower portion of this lamp hood is open as at 9 so that the light rays may project upon the front face of the signal in order that said signal may be readily discerned during darkness and on the lamp hood is mounted a suitable lens 10 preferably of red glass.

Fixed to the plate 2 adjacent the upper ends of the slots 3 are the oppositely disposed screws or threaded posts 11 on which are revolubly mounted the semaphores 12 preferably formed to represent the human arm and said semaphores are held in place by washers 13 mounted on the screws 11 and the springs 14 disposed between the said washers and the cap 15 which is held in place by nuts 16 threaded on the screws 11.

The springs 14 are utilized for forcing the semaphores in one direction for normally holding them within the signal casing as shown in Fig. 3, so that they will be hidden from view, one end of each of said springs being set in a slot 17 in its respective screw and the other end coiled about a pin or projection 18 carried by the semaphore. Each semaphore has another pin 19 at the innermost edge of its upper end to which is attached a branch connector 20 the branch connection of both of said semaphores being fastened to a chain or other flexible connection 21 passing through a guide 22 and about a roller 24 the ends of which are fixed in the lugs 25 carried by the standard 26 which is secured in any suitable manner to the plate 2 with a portion projecting below its lower edge.

The actuating parts of the signal are enclosed by the cap 15 aforementioned which has a hole 27 for registration with the lamp socket 5 and other holes 28 for registration with the screws or threaded posts 11 and said cap is shaped similar to the front portion of the signal casing with flanges 29 along certain edges adapted to overlap the flanges 6.

In the application of the signal device to an automobile, or other vehicle, the attachment may be made at any convenient point, such as the rear of the body or on the mud guard and in the present instance I show the same attached to the rear of the vehicle body and by reference to Fig. 1 it will be readily seen that the flexible connection 21 extends forward of the vehicle to an arm 30 on the shaft 31 normally forced in that direction which will return the parts of their inoperative positions by means of a spring 32 connected with the shaft and some suitable part of the vehicle such as a bracket 33. Another arm 34 is fixed to this shaft to which is attached one end of a flexible connector 35 the other end of the latter being attached to the brake pedal 36. A signal operating pedal 37 is fixed to the shaft 31.

From the foregoing it will be obvious that the signal may be operated by the pedal 37 without affecting the brake but when the brake pedal 36 is actuated the signal will be operated through the medium of the flexible connector 35 and the other associated elements.

Of course I do not wish to be limited to the exact details of construction as herein shown as these may be varied within the limits of the appended claims without departing from the spirit of my invention.

Having thus fully described my invention, what I claim as new and useful is:—

1. A vehicle signal consisting of a front plate including a body and head, portions of the side edges of said body converging toward the head, flanges carried by the angular edges of the body and having slots therethrough and a lamp hood forming a continuation of said flanges and connected with the head, the lower portion of said hood being open to permit the projection of light rays on to a portion of the outside of the casing.

2. A vehicle signal consisting of a casing having slots in two opposite sides, threaded posts fixed within the casing adjacent the upper ends of said slots, semaphores journalled on said posts, springs connected with said posts and the semaphores for normally holding the latter within the confines of the casing, a flexible connection attached to both of the semaphores, a standard carried by the casing, lugs carried by said standard and a roller journalled between said lugs about which the flexible connection operates to simultaneously move both semaphores to signal position.

In testimony whereof, I have hereunto affixed my signature.

ANTHONY HELLEBRAND.